May 5, 1959 B. S. PARMET 2,885,466
COLOR TELEVISION DEMODULATOR
Original Filed Aug. 10, 1953
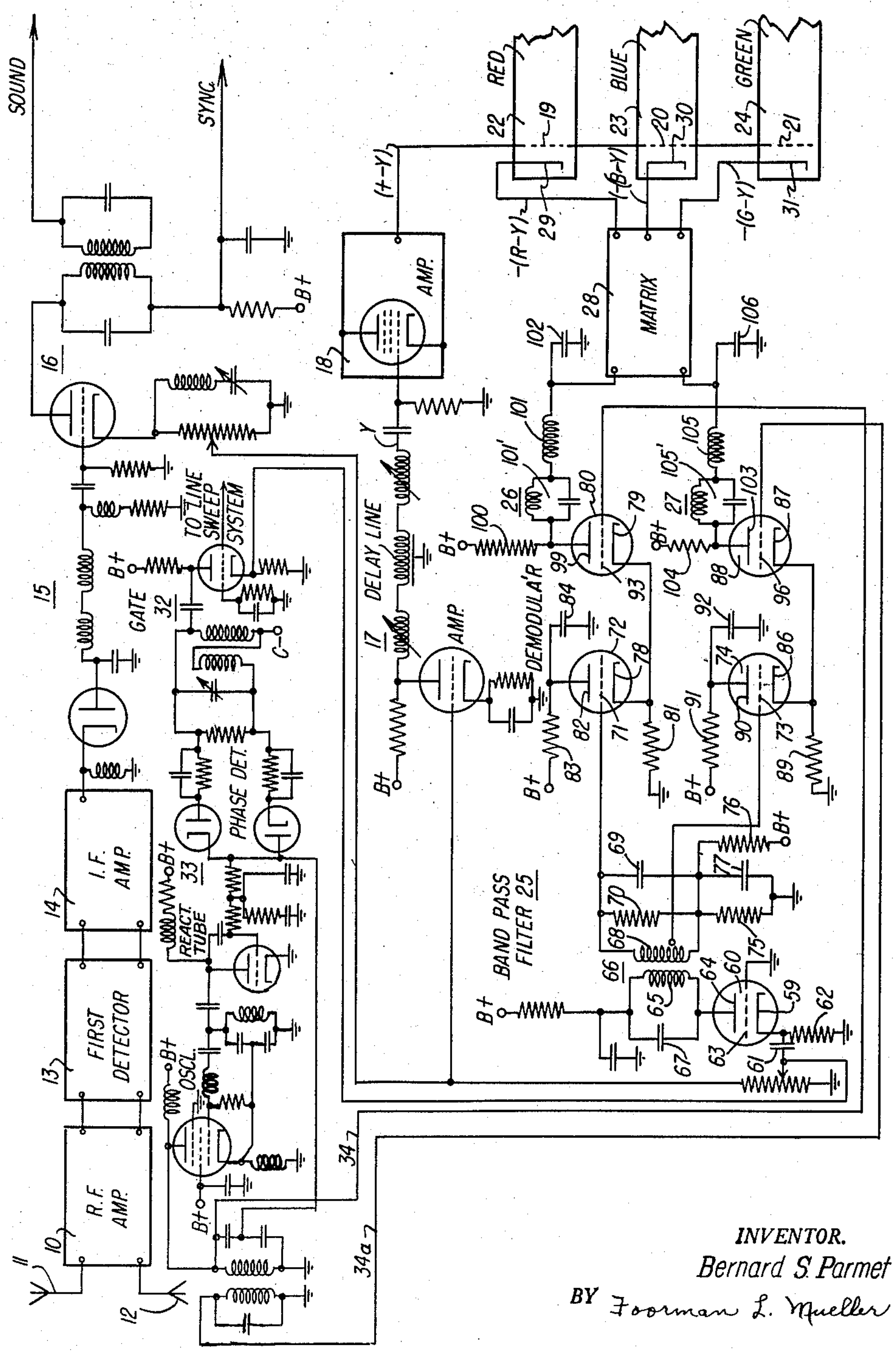
INVENTOR.
Bernard S. Parmet
BY Foorman L. Mueller
Atty 2,885,466
Patented May 5, 1959

2,885,466

COLOR TELEVISION DEMODULATOR

Bernard S. Parmet, Elmwood Park, Ill., assignor to Motorola, Inc., Chicago, Ill., a corporation of Illinois Application November 4, 1954, Serial No. 466,828

7 Claims. (Cl. 178—5.4)

This invention relates to color television and more particularly to color television receivers for use in the present day standardized color television system in which brightness or luminance information is transmitted as an amplitude modulation of a picture carrier and chroma information is transmitted as a modulation of a chroma subcarrier which, in turn, is modulated on the picture carrier.

The present application is a division of copending application Serial No. 373,356 filed August 10, 1953, and entitled Color Television Receiver, now abandoned.

In the present day standardized color television system, the luminance component of the color television signal is amplitude modulated on the picture carrier as mentioned above. The chroma subcarrier may be considered as a pair of phase quadrature subcarrier components of like frequency, with these components being amplitude modulated respectively by blue ($b-y$) and red ($r-y$) color-difference information. The color television signal also includes bursts of a reference signal having the frequency of the color subcarrier and having the phase of one of the subcarrier components referred to above. These bursts are impressed on the blanking pedestals of the line synchronizing pulses.

A receiver for operation of the standardized color television system described above may include a three-gun color image reproducer or picture tube, with the guns being adapted to produce green, red and blue images respectively. It is usual practice to use the image reproducer itself as a mixing device; with the brightness ($y$) information recovered from the picture carrier being impressed on the three guns, and with a different color-difference signal being impressed on each of the three guns. In this manner, the net modulation of each beam in the image reproducer is in accordance with a particular one of the three primary colors, so that the reproducer produces the televised scene in full color on its viewing screen. It is also usual to recover the blue and red color-difference signals by synchronous demodulation, and then to recover the green color-difference signal by matrixing the other two. A typical receiver of this general type is described in an article by C. J. Hirsch et al. appearing at page 88 of Electronics magazine published by McGraw-Hill Corp. in the February 1952 edition and entitled "Principles of NTSC Compatible Color Television."

It is an object of the present invention to provide in a color television receiver for operation in the standardized color television system described above, an improved and efficient network for demodulating the chroma subcarrier components of a received color television signal and for producing the desired color information in response thereto.

A further object of the invention is to provide an improved demodulator for recovering the modulation components of the chroma subcarrier of a received color television signal without any appreciable interaction between the subcarrier components.

A feature of the invention is the provision in a color television receiver for operation in the present day standardized color television system of a demodulator for demodulating the chroma subcarrier components of a received color television signal, which demodulator comprises a simple network for each chroma subcarrier component including a discharge device that responds to the corresponding subcarrier component and which is keyed by a control signal of like frequency derived from the reference signal components of the color television signal to demodulate that particular chroma subcarrier component to the exclusion of the other.

Yet another feature of the invention is the provision of such an improved demodulator which includes a pair of discharge devices for each subcarrier component and which are interconnected by means of a simplified network properly to perform a demodulating function and at the same time to prevent any interaction between various control signals and chroma subcarrier components impressed on the demodulator.

Yet another feature of the invention is the provision of such an improved demodulator which includes a simplified network for supplying the aforementioned color subcarrier components to the demodulating discharge devices with a desired amplitude relation for proper color reproduction.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a color television receiver incorporating the improved demodulator of the present invention.

The chroma demodulator of the present invention, as noted above, is intended to be used in a color television receiver for utilizing a color television signal including a pair of phase quadrature chroma subcarrier components each amplitude modulated with different chroma information and further including a reference signal component having a predetermined frequency and phase with respect to the subcarrier components; and which receiver includes a band-pass filter for deriving the chroma subcarrier component and a control circuit for producing in response to the reference signal component a first sinusoidal control signal having the frequency and phase of one of the chroma subcarrier components and a second sinusoidal control signal having the frequency and phase of the other subcarrier component. The demodulator comprises first and second discharge devices, each having an anode electrode, a cathode electrode and a control electrode. Means is provided for impressing the first control signal on one of the electrodes of the first device to gate the device at recurring intervals including the instant corresponding to the peak of each half cycle of the first control signal. Means is also provided for impressing the second control signal on the control electrode of the second device to gate the second device at a recurring interval including the instant corresponding to the peak of each half cycle of the second control signal. A network is coupled to the band-pass filter for impressing the chroma subcarrier components on one of the other electrodes of the discharge devices. Finally, a pair of output circuits is coupled to respective electrodes of the devices to derive the modulation components of the chroma subcarrier therefrom.

The receiver includes a radio frequency amplifier 10 having input terminals connected to an antenna circuit 11, 12, and having output terminals coupled through a first detector 13 to an intermediate frequency amplifier 14. Amplifier 14 is coupled through a second detector designated generally as 15 to a video amplifier 16.

Amplifier 16 is coupled to a further video amplifier 17 which, in turn, is coupled through a video amplifier 18 to the control electrodes 19, 20 and 21 of cathode-ray image reproducing devices 22, 23 and 24. Reproducing device 22 is constructed to reproduce the red image; whereas reproducing devices 23 and 24 are constructed to reproduce the blue and green images respectively. The resulting images from the aforementioned reproducing devices may be combined optically to reproduce the televised scene in full color. However, as previously noted, it is usual practice to combine the three devices in a single envelope which is usually referred to as a three-gun color cathode-ray image reproducer.

Amplifier 16 is also coupled through a band-pass filter 25 to a chroma demodulator 26 and to a chroma demodulator 27, which are constructed in accordance with the invention. Demodulators 26 and 27 are coupled through a matrix 28 to the respective cathodes 29, 30 and 31 of reproducing devices 22, 23 and 24.

Amplifier 16 is also coupled through a gate 32 to a continuous wave restorer 33; and the output terminals of restorer 33 are connected respectively to demodulator 26 over lead 34, and to demodulator 27 over lead 34*a*.

A color television signal constituted in accordance with present-day standards is intercepted by antenna circuit 11, 12 and amplified by radio frequency amplifier 10. The amplified signal from amplifier 10 is heterodyned to the selected intermediate frequency of the receiver in first detector 13, and the resulting intermediate frequency signal is amplified in amplifier 14 and demodulated in second detector 15. The demodulated signal is amplified in video amplifier 16 which supplies the sound and synchronizing components thereof to the appropriate channels of the receiver. Amplifier 16 also supplies the brightness ($y$) component of the demodulated signal to amplifier 17 and thence through amplifier 18 to the control electrodes 19, 20 and 21 of the image reproducers 22—24. Amplifier 16 also supplies the aforementioned phase quadrature chroma subcarrier components to band-pass filter 25 which selects both subcarrier components and supplies them to demodulators 26 and 27.

Gate 32 selects the aforementioned bursts of reference signal and supplies such bursts to restorer 33. The latter unit responds to these bursts to produce a sinusoidal continuous wave control signal having the frequency and phase of the reference signal component. The resulting continuous wave control signal is supplied directly over lead 34 to demodulator 26 where it is used to demodulate the ($r—y$) color information from the ($r—y$) chroma subcarrier component. In addition, the continuous wave control signal from unit 33 is phase shifted 90 degrees, and the phase-shifted sinusoidal control signal is supplied over lead 34*a* to demodulator 27 to recover the ($b—y$) color information from the other chroma subcarrier components. The demodulated color difference signals from demodulators 26, 27 are supplied to matrix 28 which is constructed to supply the appropriate color difference signals to the cathodes 29, 30 and 31 of the image reproducers so that these color-difference signals may cooperate with the brightness signal on the control electrodes in known manner so that each image reproducer reproduces its appropriate color image.

Band-pass filter 25 includes an electron discharge device 60 which is cathode coupled to the amplifier 16. The cathode 59 of device 60 is connected to ground through a resistor 62, and the control electrode of this device is connected directly to ground. The anode 64 of the device is connected to the positive terminal B+ through the primary winding 65 of a transformer 66 and through a suitable series-connected voltage dropping resistor. Discharge device 60 constitutes a portion of band-pass filter 25 and functions as a grounded grid amplifier. In this manner, the chroma subcarrier components passed by the band-pass filter 25 to the chroma channel of the receiver are additionally amplified by device 60.

Primary winding 65 of transformer 66 is shunted by a capacitor 67. Transformer 66 has a secondary winding 68 which is shunted by a capacitor 69 and which has a damping resistor 70 connected there across. The band-pass filter is designed to have the necessary band-pass characteristics so that the chroma subcarrier components and their modulation side-bands are passed thereby to the exclusion of the other components of the demodulated color television signal.

The high voltage side of winding 68 is connected to the control electrode 71 of an electron discharge device 72 in the modulator 26, and a tap on the secondary winding 68 is connected to the control electrode 73 of an electron discharge device 74 in demodulator 27. The lower side of winding 68 is connected to the common junction of a pair of resistors 75 and 76, with the latter resistors being connected as a potentiometer between B+ and ground to provide a positive bias for control electrodes 71 and 73. Resistor 75 is shunted by a by-pass capacitor 77 so that the lower side of winding 68 is established at ground potential for the subcarrier frequencies. The cathode 78 of discharge device 72 is connected to the cathode 79 of a further electron discharge device 80 in demodulator 26, and these cathodes are connected to ground through a common resistor 81. The anode 82 of device 72 is connected to B+ through a load resistor 83 and is by-passed to ground through a capacitor 84, so that discharge device 72 functions as a grounded-plate amplifier.

The cathode 86 of discharge device 74 is connected to the cathode 87 of a further electron discharge device 88 in demodulator 27, and these cathodes are connected to ground through a common resistor 89. The anode 90 of discharge device 74 is connected to B+ through a load resistor 91, and the anode is by-passed to ground through a capacitor 92, so that device 74 also functions as a grounded-plate amplifier. Control electrode 93 of discharge device 80 is coupled to restorer 33 through lead 34, and control electrode 96 of discharge device 88 is coupled to the restorer through lead 34*a*.

Device 80 has an anode 99 connected to B+ through a resistor 100, and the anode is coupled to an input terminal of matrix 28 through an inductance coil 101 and a trap circuit 101′, the side of inductance coil 101 remote from anode 99 being coupled to ground through a capacitor 102. The anode 103 of device 88 is connected to B+ through a resistor 104, and the latter anode is coupled to another input terminal of matrix 28 through an inductance coil 105 and trap circuit 105′, the side of inductance coil 105 remote from anode 103 being coupled to ground through a capacitor 106. Trap circuits 101′ and 105′ are tuned to the frequency of the chroma subcarrier to remove the subcarrier components from the output signals appearing at the anodes of devices 80 and 88.

Band-pass filter 25 supplies the subcarrier components to the control electrodes 71 and 73 of respective devices 72 and 74. These subcarrier components are translated by devices 72 and 74, which function as isolation buffer stages, and are impressed on the cathodes 79 and 87 of respective devices 80 and 88. The control signal from restorer 33 is applied over lead 34 to control electrode 93 of device 80 and is in phase with the ($r—y$) subcarrier component and in phase quadrature with the ($b—y$) subcarrier component.

The forced positive bias on the control electrode 71 of device 72 produces a current flow through this device with a corresponding positive voltage drop across cathode resistor 81. This drives the cathode 79 of device 80 positive so that device 80 is normally non-conductive. The control or reference signal on control electrode 93 from lead 34 gates the device on at a recurring interval corresponding to the instant each positive cycle thereof passes through its peak. Since the (r—y) color subcarrier component is in phase with this control signal, these intervals occur when the (r—y) subcarrier component is at the optimum carrier amplitude so that the amplitude modulation components of that subcarrier are translated by device 80 and supplied to matrix 28. The (b—y) subcarrier component, however, is in phase quadrature with the control signal impressed on device 80, so that device 80 is turned on or rendered conductive thereby at the instant each cycle of the latter subcarrier component passes through zero A.C. axis so that none of its modulation components is translated by device 80. Device 80, therefore, functions as a switch and in response to the control signal on lead 34, demodulates only the (r—y) subcarrier component and translates only the (r—y) color difference signal to matrix 28.

In like manner, device 88 is rendered normally nonconductive by the positive voltage drop across cathode resistor 89 due to the forced positive bias on device 74. Device 88, on the other hand, is keyed by the 90 degree phase-shifted control signal from restorer 33 which is impressed on its control electrode 96 over lead 34a. This device functions in the same manner as device 80 but to translate only the (b—y) demodulation components derived from the (b—y) subcarrier component impressed on its cathode 87 by device 74. Device 88, therefore, supplies only the (b—y) color-difference signal to matrix 28. The (r—y) and (b—y) color-difference signals derived from devices 80 and 88 are mixed in matrix 28 in known manner to produce the (g—y) color-difference signal, and so that the three color-difference signals may be impressed with the proper polarity on reproducers 22, 23 and 24.

Since the chroma subcarrier components are, in each instance, supplied to control electrodes 71 and 73 of devices 72 and 74 and, thence, to cathodes 79 and 87 of devices 80 and 88; there is no inter-action between the subcarrier components and the control or reference signals applied respectively to control electrodes 93 and 96 of the latter devices. Likewise, there can be no inter-action between the control signals applied to control electrodes 93 and 96 of devices 80 and 88, and the subcarrier components applied to the control electrodes 71 and 73 of devices 72 and 74.

The desired amplitude relation between the (r—y) and (b—y) color-difference signals from demodulators 26 and 27 can be achieved merely by adjusting the tap on secondary 68 of transformer 66 which is connected to control electrode 73 of device 74.

Gate circuit 32 and continuous wave restorer 33 are described in detail in the parent copending application Ser. No. 373,356, and it is believed unnecessary to describe these units in detail herein. Briefly, gate 32 selects and amplifies the color reference bursts from the received color television signal, and these bursts are impressed on the phase detector portion of the restorer in which they are compared with the output signal of the oscillator portion of the restorer to obtain a control signal. The control signal is impressed on the reactance tube section of the restorer which controls the frequency of the oscillator, so that the frequency of the sinusoidal reference output signal of the oscillator is maintained in phase and frequency synchronism with the reference bursts. This reference signal is supplied to demodulator 26 over lead 34. A quadrature network is included in the output circuit of the oscillator so that a second continuous wave sinusoidal reference signal in phase quadrature with the first is developed and supplied to demodulator 27 over lead 34a.

The invention provides, therefore, an improved and simplified demodulator system for operation in a receiver for utilizing a present-day standardized color television signal, and which incorporates relatively simple networks for efficiently demodulating the chroma subcarrier components and for deriving and segregating the resulting color-difference signals.

I claim:

1. In a color television receiver for utilizing a color television signal including at least one chroma subcarrier component modulated in accordance with color information, and further including a reference signal component having a frequency and phase bearing a predetermined relation to the aforesaid subcarrier component; which receiver includes a first network for deriving the chroma subcarrier component from the color television signal, a second network for deriving the reference signal component from the color television signal and for producing a control signal having the frequency and phase of the chroma subcarrier component in response to the reference signal component; a demodulator for the chroma subcarrier component including in combination a pair of electron discharge devices each having an anode, a cathode and a control electrode; a common impedance element connecting the cathodes of said devices to a point of reference potential; means for coupling the first network to the control electrode of one of said discharge devices; means for coupling the second network to the control electrode of the other of said discharge devices; and an output circuit coupled to the anode of one of said devices for deriving the modulation components of the chroma subcarrier component.

2. In a color television receiver for utilizing a color television signal including at least one chroma subcarrier component amplitude modulated in accordance with color information, and further including a reference signal component having a frequency and phase bearing a predetermined relation to the chroma subcarrier component, which receiver includes a band-pass filter for deriving the chroma subcarrier component from the color television signal, a circuit for deriving the reference signal component from the color television signal and for producing a control signal having the frequency and phase of the chroma subcarrier component in response to the reference signal component; a demodulator for the chroma subcarrier component including in combination first and second electron discharge devices each having an anode, a cathode and a control electrode; a common resistor connecting the cathodes of said devices to a point of reference potential; means for coupling the band-pass filter to the control electrode of said first discharge device; means for coupling the circuit for deriving the reference signal to the control electrode of said second discharge device; and an output circuit coupled to the anode of said second discharge device for deriving the modulation components of the chroma subcarrier component.

3. In a color television receiver for utilizing a color television signal including at least one chroma subcarrier component amplitude modulated with chroma information and further including a reference signal component having the frequency of the subcarrier component and a predetermined phase with respect thereto, and which receiver includes filter means for deriving the chroma subcarrier component and a control circuit for producing in response to the reference signal component a continuous cyclic control signal having the frequency and phase of the chroma subcarrier component, a demodulator for the chroma subcarrier component including in combination, a triode electron discharge device having a cathode and a control grid which serve as input electrodes and an anode, network means coupled to the filter means and to the control circuit and connected to said input electrodes of said electron device for applying the chroma subcarrier component and the cyclic control signal thereto, said network means being connected to apply the chroma subcarrier component to one of said input electrodes and to apply the control signal to the other of said input electrodes and including means providing a bias to said electron device, means including said network means whereby the level of said control signal is related to said bias so that said device is rendered conducting only during recurring intervals which include the instant corresponding to the peaks of the half-cycles of the control signal on one side of the axis thereof, whereby said electron device conducts only when the subcarrier component reaches its peak amplitude and provides an output which varies with the amplitude of the subcarrier component, and output circuit means coupled to said anode of said electron device for deriving the modulation component of said chroma subcarrier component therefrom.

4. In a color television receiver for utilizing a color television signal including at least one chroma subcarrier component amplitude modulated with chroma information and further including a reference signal component having the frequency of the subcarrier component and a predetermined phase with respect thereto, and which receiver includes filter means for deriving the chroma subcarrier component and a control circuit for producing in response to the reference signal component a continuous cyclic control signal having the frequency and phase of the chroma subcarrier component; a demodulator for the chroma subcarrier component including in combination, a three element amplifying electron device having first and second input electrodes and an output electrode, network means coupled to the filter means and to the control circuit and connected to said input electrodes of said electron device for applying the chroma subcarrier component and the cyclic control signal thereto, said network means being connected to apply the chroma subcarrier component to said first input electrode and to apply the control signal to said second input electrode and including means providing a bias to said electron device, means including said network whereby the level of said control signal is related to said bias such that said device is rendered conducting only during recurring intervals which include the instant corresponding to the peaks of the half-cycles of the control signal on one side of the axis thereof, whereby said electron device conducts only when the subcarrier component reaches its peak amplitude and provides an output which varies with the amplitude of the subcarrier component, and output circuit means coupled to said output electrode of said electron device for deriving the modulation component of said chroma subcarrier component therefrom.

5. In a color television receiver for utilizing a color television signal including a pair of chroma subcarrier components each amplitude modulated with different chroma information and having a predetermined phase relation, and further including a reference signal component having a predetermined frequency and phase with respect to the subcarrier components, and which receiver includes a bandpass filter for deriving the chroma subcarrier components and a control circuit for producing in response to the reference signal component a first continuous cyclic control signal having the frequency and phase of one of the chroma subcarrier components and a second continuous cyclic control signal having the frequency and phase of the other of the subcarrier components; a demodulator for the chroma subcarrier components including in combination, first and second triode electron devices each having a cathode and a control grid which serve as input electrodes and an anode, network means coupled to the bandpass filter and connected to one input electrode of each of said electron devices for applying the chroma subcarrier components thereto, said network means being coupled to the control circuit and being connected to the other input electrodes of said electron devices to apply the first control signal to said first electron device and to apply the second control signal to said second electron device, said network means including means providing a bias to said electron devices which is related to the amplitude of the control signals such that said devices are rendered conducting only at a recurring interval which includes the instant corresponding to the peak of each alternate half-cycle of the control signals, whereby each of said devices conducts only when one subcarrier component reaches its peak amplitude, and output circuit means coupled to said anodes of said first and second electron devices for deriving the modulation components of said chroma subcarrier components therefrom.

6. In a color television receiver for utilizing a color television signal including a pair of chroma subcarrier components each amplitude modulated with different chroma information and having a predetermined phase relation, and further including a reference signal component having a predetermined frequency and phase with respect to the subcarrier components, and which receiver includes a bandpass filter for deriving the chroma subcarrier components and a control circuit for producing in response to the reference signal component a first continuous cyclic control signal having the frequency and phase of one of the chroma subcarrier components and a second continuous cyclic control signal having the frequency and phase of the other of the subcarrier components; a demodulator for the chroma subcarrier components including in combination, first and second triode electron devices each having a cathode and a control grid which serve as input electrodes and an anode, network means coupled to the bandpass filter and including a coupling transformer having a first secondary winding portion connected to one input electrode of said first electron device and a second secondary winding portion connected to one input electrode of said second electron device for applying the chroma subcarrier components thereto, said first and second secondary winding portions applying the subcarrier components to said electron devices with a predetermined amplitude relation different from unity, said network means including a portion coupled to the control circuit and connected to the other input electrodes of said electron devices to apply the first control signal to said first electron device and to apply the second control signal to said second electron device, said network means including means providing a bias to said electron devices which is related to the amplitude of the control signals such that said devices are rendered conducting only at a recurring interval which includes the instant corresponding to the peak of each alternate half-cycle of the control signals, whereby each of said devices conducts only when one subcarrier component reaches its peak amplitude, and output circuit means coupled to said anodes of said first and second electron devices for deriving the modulation components from said chroma subcarrier components.

7. In a color television receiver for utilizing a color television signal including a pair of chroma subcarrier components each amplitude modulated with different chroma information and having a predetermined phase relation, and further including a reference signal component having a predetermined frequency and phase with respect to the subcarrier components, and which receiver includes a control circuit for producing in response to the reference signal component a first control signal having the frequency and phase of one of the chroma subcarrier components and a second control signal having the frequency and phase of the other of the subcarrier components; a demodulator for the chroma subcarrier components including in combination, first and second demodulation sections; a bandpass amplifier for deriving the subcarrier components and including a coupling transformer having a first secondary winding portion and a second secondary winding portion for respectively impressing said subcarrier components on said first and second demodulation sections with a predetermined amplitude relation different from unity; means for impressing said first control signal on said first demodulation section; means for impressing said second control signal on said second demodulation section, each of said demodulator sections including means whereby an output is produced thereby only when the control signal applied thereto reaches its peak amplitude on one side of its axis and whereby the output varies with the amplitude of the chroma subcarrier components at such time to thereby derive the modulation component from one subcarrier component, and a pair of output circuits respectively coupled to said first and second demodulation sections and respectively responsive to the modulation of the chroma subcarrier components.

References Cited in the file of this patent

UNITED STATES PATENTS 2,725,422 Stark ------------------ Nov. 29, 1955

OTHER REFERENCES

Electronics, January 1953, pages 98–104.